(No Model.) 2 Sheets—Sheet 1.

H. S. PALMER.
MACHINE FOR MOLDING BUILDING BLOCKS.

No. 375,377. Patented Dec. 27, 1887.

Witnesses
C. B. Taylor
J. W. Garner

Inventor
Harmon S. Palmer
By his Attorneys,
C. A. Knowles

N. PETERS. Photo-Lithographer, Washington, D. C.

(No Model.) 2 Sheets—Sheet 2.
H. S. PALMER.
MACHINE FOR MOLDING BUILDING BLOCKS.
No. 375,377. Patented Dec. 27, 1887.
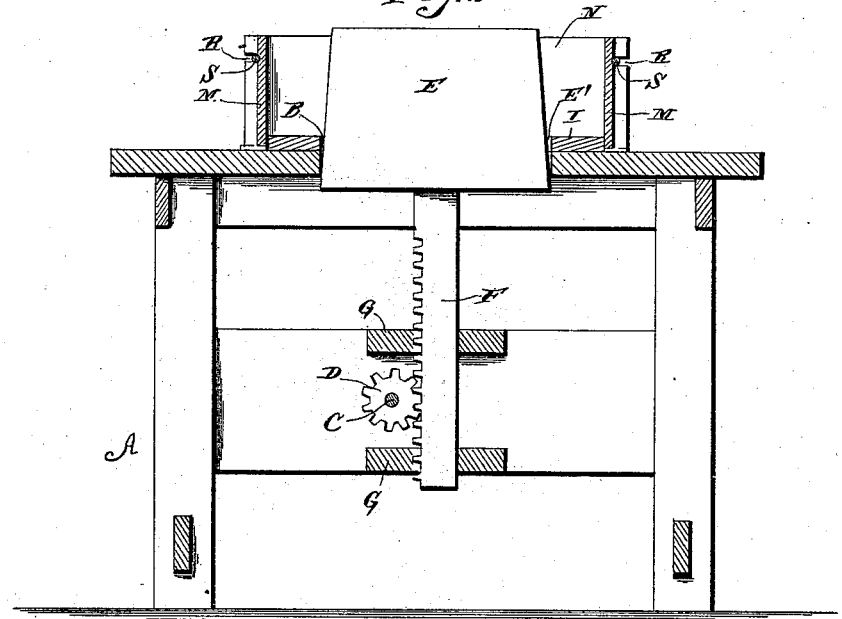
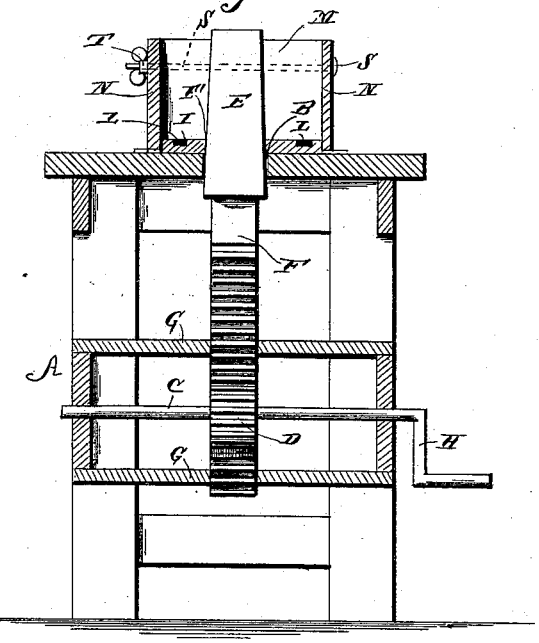
Witnesses
C. L. Taylor
J. W. Garner
Inventor
Harmon S. Palmer
By his Attorneys,
C. A. Knowles

UNITED STATES PATENT OFFICE.

HARMON S. PALMER, OF CHATTANOOGA, TENNESSEE.

MACHINE FOR MOLDING BUILDING-BLOCKS.

SPECIFICATION forming part of Letters Patent No. 375,377, dated December 27, 1887.

Application filed April 5, 1887. Serial No. 233,750. (No model.)

*To all whom it may concern:*

Be it known that I, HARMON S. PALMER, a citizen of the United States, residing at Chattanooga, in the county of Hamilton and State of Tennessee, have invented a new and useful Improvement in Machines for Molding Building-Blocks, of which the following is a specification.

My invention relates to an improvement in machines for molding building-blocks; and it consists in the peculiar construction and combination of devices that will be more fully set forth hereinafter, and particularly pointed out in the claim.

This machine is particularly adapted for molding the building-blocks described in my pending application for Letters Patent of the United States, Serial No. 227,696, filed February 15, 1887.

Figure 1:
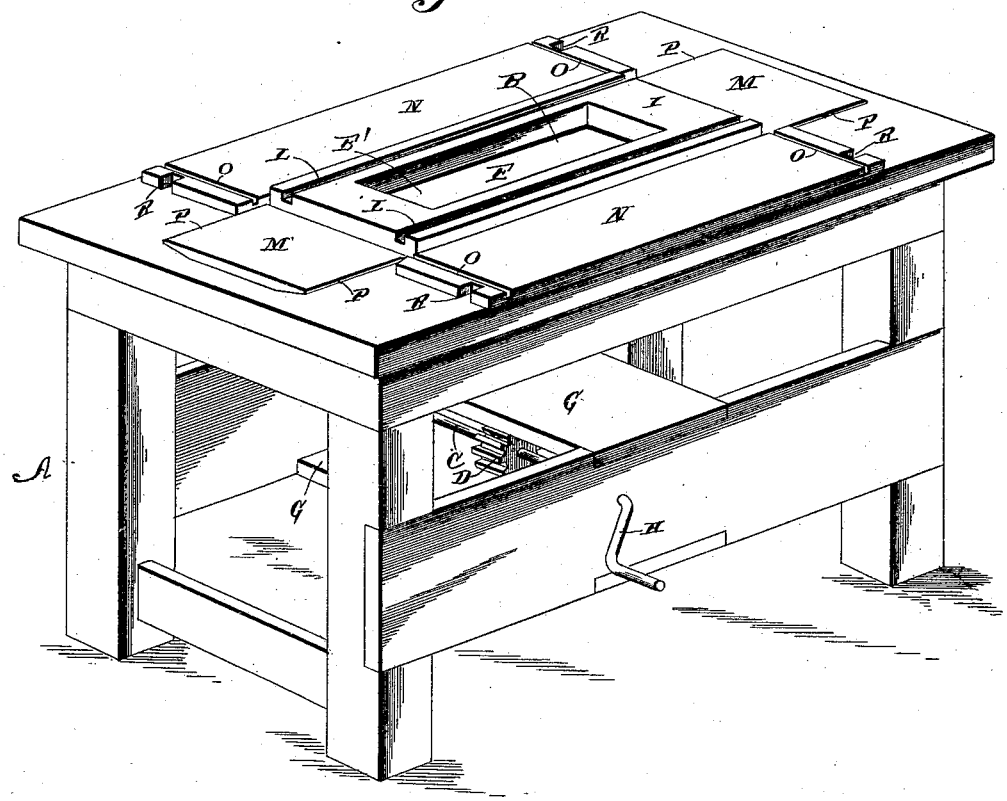
Figure 4:
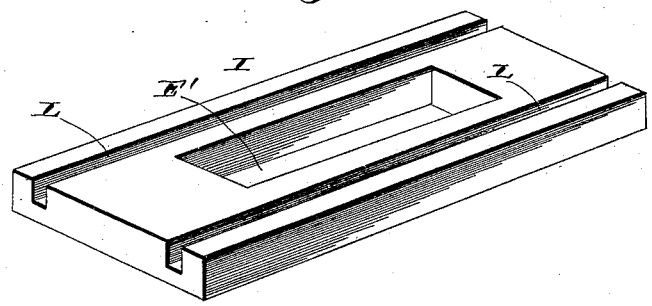

In the drawings, Figure 1 is a perspective view of a machine embodying my improvements. Fig. 2 is a vertical longitudinal sectional view of the same. Fig. 3 is a vertical transverse sectional view of the same. Fig. 4 is a detached perspective view of the bottom plate.

A represents a table or frame, the top of which is provided at its center with an elongated rectangular opening, B. In suitable bearings, under the top of the table and near the center thereof, is journaled a transverse shaft, C, which is provided at its center with a spur-pinion, D.

E represents a core-block adapted to move vertically in the opening B. The base of this core-block exactly fits in the said opening; but the sides and ends of the core-block are slightly inclined, as shown, and thereby the upper end of the core-block is slightly smaller than the base thereof, the core-block being thus rendered substantially wedge-shaped. From the lower side of the core-block, at the center thereof, depends a vertical bar, F, which extends through supporting-keepers G. One side of the bar F is provided with a series of rack-teeth which mesh with the pinion D. A crank, H, is provided for one end of the shaft C, and by turning the said crank the pinion is caused to rotate, and thereby either move the core-block upwardly in the opening B, or else lower it therein, according to the direction in which the shaft C is rotated.

I represents a removable bottom plate, which is provided with a central opening, E', corresponding in size and shape with the opening B. This plate I forms the bottom of the mold, and is provided on its upper side with longitudinal grooves L, for the purpose to be hereinafter explained.

M represents a pair of plates or boards which form the ends of the mold, and have their lower edges hinged to the table-top just beyond the ends of the bottom plate, I, when the latter is in position on the table-top.

N represents a pair of boards or plates which form the sides of the mold, and have their lower edges similarly hinged to the table-top just beyond the sides of the bottom plate, I. These side boards or plates, N, are provided near their ends on their opposing sides with grooves O, and the ends of the boards or plates M are beveled on their outer sides to form projections P, which are adapted to fit in the grooves O, as shown. The ends of the side boards or plates, N, are also provided near their free edges with open slots R.

S represents a pair of bolts, which are adapted to fit in the said slots and connect the side plates or boards, N, together when the latter are closed against the ends of the end plates or boards, N, and the said bolts S are provided at their threaded ends with wing-nuts T, which are adapted to clamp the side boards or plates, N, firmly in position against the ends of the end boards or plates, M.

The operation of my invention is as follows: In order to mold a building-block, the bottom plate, I, is first placed on the table-top and the sides and ends of the mold are closed against each other in the position shown in Figs. 2 and 3, and clamped in this position by means of the bolts S and the nuts T. The crank H is then turned, so as to raise the core-block in the center of the mold until the upper end of the said core-block is on a level with the upper edges of the sides and ends of the mold. Concrete or other suitable material in a semi-plastic condition is then poured into the mold and is firmly tamped therein. The bolts S are then removed from the slots R, and the sides and ends of the mold are folded downwardly upon the table-top, and the crank H is turned so as to withdraw the core-block from the center of the building-block formed of the cement, thereby leaving the said building-block upon the bottom plate, I. The latter is then removed from the table or frame, with the building-block upon it, and is placed in a suitable location to dry, and another bottom plate is then placed upon the table-top, and the operation before described repeated to make another building-block.

The grooves L on the upper side of the bottom plate cause the block formed in the mold to be provided with similar projecting tongues, for the purpose of securing the building-blocks together when the same are used to form a wall.

The core-block E causes a longitudinal opening to be formed in the center of each building-block, thereby reducing the weight thereof, economizing the material of which the block is formed, and also enabling the block to be used in constructing flues, as described in my before-mentioned pending application.

It will be noted that a number of plates I are used in connection with the molding-machine, in order to enable each block as soon as it is molded to be removed from the machine and allowed to harden, as the blocks cannot at once be taken from the bottom plate without risk of injuring or destroying them.

Having thus described my invention, I claim—

The improved brick-mold herein described and shown, comprising the table or frame having the opening B in its top, the removable bottom plate resting on the table-top and provided with the central opening, E', corresponding to the opening B, the vertically-moving core-block E, moving through said openings B and E', the side and end plates hinged to the table-top, and means for holding said plates in an upright position, substantially as specified.

In testimony that I claim the foregoing as my own I have hereto affixed my signature in presence of two witnesses.

HARMON S. PALMER.

Witnesses:
G. W. SIMMONS,
W. P. McCLATCHY.